Figure 1:
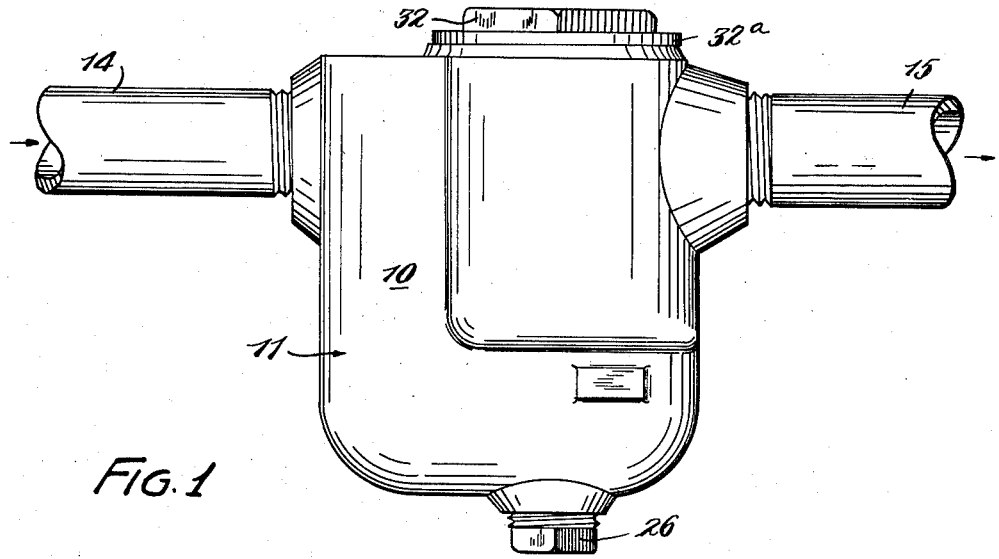

Sept. 22, 1953     C. W. ST. CLAIR     2,652,980

THERMOSTAT-CONTROLLED CONDENSATION DRAINER

Filed April 11, 1951

INVENTOR.
CHARLES W. ST. CLAIR
BY Hudson Boughton,
Williams, David & Hoffmann.
ATTORNEYS Patented Sept. 22, 1953

2,652,980

UNITED STATES PATENT OFFICE 2,652,980

THERMOSTAT-CONTROLLED CONDENSATION DRAINER

Charles W. St. Clair, Painesville, Ohio, assignor to The Coe Manufacturing Company, Painesville, Ohio, a corporation of Ohio Application April 11, 1951, Serial No. 220,479

1 Claim. (Cl. 236—56)

This invention relates to condensation draining devices by which condensate is removed from pipe lines, steam coils or other apparatus, and relates more particularly to condensation drainers of the continuous type having a normally open restricted passage or orifice for the discharge of trapped condensate and in which temperature responsive means automatically controls the flow capacity of such restricted passage or orifice.

An object of the present invention is to provide an improved thermostatically controlled condensation drainer of this kind which will function economically and reliably and for a prolonged period of service by reason of the fact that it is adapted to operate within a temperature range which is relatively small and relatively close to but below the evaporation temperature of the condensate, such that a relatively small but continuous flow of condensate will be discharged and the loss of steam by a periodic blowing through the drainer, as has occurred in previous devices, will be substantially eliminated.

Another object is to provide an improved thermostatically controlled condensation drainer of the character mentioned in which an expansible and contractible thermostatic device actuates a metering means for variably controlling the condensate flow through the drainer, and in which the inlet portion of the drainer includes a collecting chamber adapted to collect and retain a substantial body of condensate as a liquid seal for the metering means and into which the heat of incoming steam will be dissipated, such that the temperature changes to which the thermostat device is subjected will be only small and gradual temperature changes, and hence, the flow of condensate through the device will be automatically maintained as a small but continuous flow assuring the preservation of the liquid seal in the collecting chamber and protecting the thermostat device against frequent large and sudden expanding and contracting movements which would cause early failure thereof.

Still another object is to provide an improved thermostatically controlled condensation drainer of this character, in which the temperature responsive control means includes a bellows or the like located in the discharge chamber of the drainer to be responsive to the temperature of the fluid delivered through the orifice, and in which a quantity of condensate is retained in the discharge chamber of a depth such that the bellows will be immersed, or partially immersed, therein.

As a further object this invention provides an improved condensation drainer of the thermostatic type having a temperature responsive bellows or the like located in the discharge chamber thereof and in which novel deflector means shields the bellows from being directly impinged by the fluid being delivered through the flow control passage.

Still another object is to provide an improved condensation drainer of the character above-mentioned, in which the outlet means for the discharge chamber includes a dam partially restricting the outlet passage for the retention of the condensate in which the bellows is immersed.

The invention can be further briefly summarized as consisting in certain novel combination and arrangements of parts hereinafter described, and particularly set out in the claim hereof.

Figure 2:
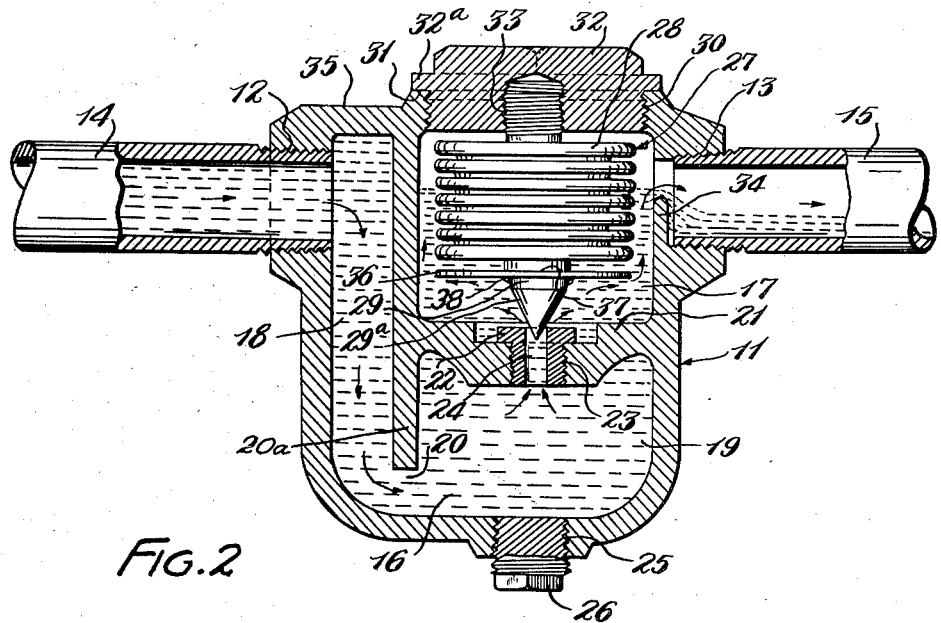

In the accompanying sheet of drawings,

Fig. 1 is an outside elevational view showing a condensation drainer embodying the present invention; and Fig. 2 is a longitudinal vertical section taken through the drainer substantially on the longitudinal vertical mid-plane thereof.

As one practical embodiment of this invention, the drawing shows the improved condensation drainer 10 as comprising a housing 11 having inlet and outlet openings 12 and 13. The inlet opening 12 is adapted to be connected with a pipe coil, or other steam using apparatus from which condensate is to be removed, as by means of the conduit 14. The outlet opening 13 is adapted to be connected with a point of condensate disposal, such as a hot-well or a waste drain, as by means of a conduit 15.

The housing 11 of the improved drainer is provided in the inlet portion thereof with a condensate collecting chamber 16 and is provided in the outlet portion thereof with a discharge chamber 17. The condensate collecting chamber 16 is an important feature of this improved drainer as will be further explained hereinafter and may be formed by laterally adjacent, upright branch portions 18 and 19, which are connected in series relation adjacent their lower ends by a relatively short connecting passage 20. The chamber portion 18 comprises a down-flow branch portion which connects the inlet opening 12 with the connecting passage 20, and the chamber portion 19 constitutes an up-flow branch portion. The communication of the inlet opening 12 with the branch portion 18 is at a point adjacent the upper end of the latter. By reason of the presence of the depending baffle wall 20ª, the connecting passage 20 leads into the chamber 16 substantially at or adjacent the extreme bottom thereof, such that the incoming condensate or vapor must enter the lower portion of the body of collected condensate of substantial volume which is present in the chamber 16 and must become mingled with this body of collected condensate before it can possibly reach the orifice passage 24.

As shown in Fig. 2 of the drawing, the discharge chamber 17 is preferably located directly above the up-flow branch 19 and is separated therefrom by the transverse wall 21 of the housing 11. An orifice fitting 22 mounted in an opening 23 of the wall 21 contains an orifice passage 24 forming a flow control passage which connects the upper end of the up-flow branch 19 with the discharge chamber 17.

The condensate which is supplied to the drainer 10 by the conduit 14, collects in the chamber 16 and, under the steam pressure of the supply conduit, is forced into the up-flow branch 19 to substantially fill the same and provide a liquid seal for the orifice passage 24 which prevents steam from blowing through this passage. At the lower end of the collecting chamber 16, the housing 11 is provided with a drain opening 25 which is adapted to be closed by a screw plug 26.

The flow capacity of the orifice passage 24 is controlled by a temperature responsive unit 27 which is located in the discharge chamber 17 so as to be responsive to the temperature of the fluid which is discharged into this chamber through the orifice passage. The temperature responsive unit 27 comprises an expansible and contractible member, preferably in the form of a flexible corrugated shell or bellows 28, and a metering element 29 connected with the bellows for actuation thereby and disposed in cooperating relation to the orifice fitting 22.

The bellows 28 comprises a temperature responsive device of the kind having a volatile liquid or expansible medium sealed therein which will generate pressure within the bellows and expand the same whenever the bellows is subjected to heating by the fluid delivered into the discharge chamber 17 through the orifice passage 24. The metering element 29 is in the form of a depending stem connected with and carried by the lower end of the bellows and disposed in coaxial alignment with the orifice passage 24. The lower end of the metering element 29 is here shown as being in the form of a convergently tapered valve element or metering point 29ª which extends partway into the upper end of the orifice passage 24 and restricts the same with respect to the flow capacity thereof.

When the rate of condensate flow through the drainer 10 is relatively slow such that the collected condensate fills the receiving chamber 16 and backs up into the conduit 14, the bellows 28 will be subjected to a cooling influence and will contract. The contraction will partially withdraw the metering point 29ª from the orifice fitting 22 to thereby enlarge the flow capacity of the orifice passage 24. When the rate of condensate flow through the drainer 10 is relatively rapid such that the condensate entering the discharge chamber 17 is relatively hot or contains some steam, the bellows 28 will be subjected to heating and will expand. The expansion of the bellows moves the metering point 29ª downwardly to restrict the flow capacity of the orifice passage 24 and thus reduce the rate of condensate flow through the device and prevent the loss of steam.

At the upper end of the discharge chamber 17, the housing 11 is provided with an opening 30 of a size to permit the insertion of the bellows 28 therethrough. In surrounding relation to the opening 30 the housing 11 is also provided with a locating surface 31. A screw plug 32 forms a closure for the opening 30 and has a portion, such as the projecting lateral flange 32ª thereof, engageable with the locating surface 31.

The bellows 38 is connected with and carried by the plug 32 so as to constitute therewith an assembly unit. For this purpose the upper end of the bellows 28 is provided with a mounting stem 33 by which it is connected with the plug 32, as by being screwed into a threaded opening of the latter. In applying this plug and bellows assembly to the housing 11, the bellows 28 is inserted into the chamber 17 through the opening 30 and when the plug has been screwed into the latter opening so as to engage the locating surface 31, the bellows will be disposed in proper axial alignment with the orifice fitting 22 and the metering point 29ª will be located in proper cooperating relation to the upper end of the orifice passage 24.

As has already been broadly indicated above, the collecting chamber 16 is very important because it collects and retains a substantial body of condensate in the inlet portion of the drainer as a liquid seal for the orifice passage 24 and as a liquid shield or heat buffer for the bellows 28. With respect to the latter function it is pointed out that whenever steam happens to enter the drainer it is mingled with this collected condensate and the heat of such steam is absorbed or dissipated in the condensate. Under such a condition of operation the bellows will be subjected to some increase of temperature because of the heating of the collected condensate by the steam, but this temperature increase will be very small and very gradual as compared with the temperature increase to which the bellows would be subject if the steam impinged directly thereagainst.

In accordance with the present invention, a quantity of condensate is also trapped or retained in the discharge chamber 17 such that the bellows 28 will be immersed for a portion of its length in such trapped condensate. For this purpose, the communication of the outlet passage 13 with the discharge chamber 17 is located at a relatively high point of the latter and, in this instance, the outlet passage 13 also includes a lip or flange forming a dam 34 which partially restricts this outlet passage and determines the level or depth of the trapped condensate in the chamber 17. The lip or flange forming the dam 34 is here shown as being a wall formed integral with the housing 11 and located at the inner end of the outlet passage 13 and extending across substantially the lower half of this passage. Outwardly of the dam 34, the passage 13 is internally threaded for the connection of the discharge conduit 15 therewith. The extent to which the bellows 28 is immersed in such trapped condensate in the discharge chamber 17, can be varied and will depend upon the operating characteristics desired for the drainer 10.

When the bellows is thus immersed or partially immersed in the trapped condensate of the discharge chamber 17 and is shielded by a substantial body of condensate trapped in the collecting chamber 16, the bellows will not be subject to violent flexing by reason of large and sudden expanding and contracting movements, but will be subject only to relatively small and more gradual expanding and contracting movements as the bellows is heated or cooled in response to the transfer of heat relative thereto through the trapped condensate. It is usually sufficient for an economical and reliable functioning of the drainer to have approximately one-third of the length of the bellows 28 immersed in the trapped condensate, although, the extent of immersion can be varied as has been indicated above.

By reason of the shielding of the bellows by the condensate collected in the chamber 16 and the partial immersion of the bellows 28 in the trapped condensate of the discharge chamber 17, the drainer 10 will have a very stable and reliable operating characteristic such that it will function consistently within a very small temperature range such as a range of only ten or fifteen degrees Fahrenheit between the fully open and fully closed conditions of the metering point 29ª. The result of this stable operating characteristic of the drainer 10 is that its normal operating temperature will be below the evaporation temperature of water, that is to say below 212 degrees Fahrenheit, and this relatively cool condition will prevail during the normal functioning of the drainer. Because of the sensitive character of this improved drainer and its relatively narrow temperature range of operation, a small but continuous flow of condensate will be delivered and the wasteful condition where steam blows through the orifice passage 24 will substantially never occur, except in the case of failure of the bellows 28.

Since the bellows 28 is located in the discharge chamber 17 where it will not be exposed to water hammer or to the pressure of the steam in the conduit 14, and because of the relatively small and gradual expanding and contracting movements to which the bellows 28 is subject as explained above, the bellows will remain in good operating condition for a prolonged period of service. If, however, the bellows 28 should ultimately fail, such failure will in most cases, be the result of leakage of the volatile liquid or confined medium from the bellows chamber. When this occurs, the bellows will contract which will result in the orifice passage 24 being opened and maintained at its maximum flow capacity. The abnormal operation of the drainer 10 during such a condition of bellows failure, will result in an operating temperature higher than normal, that is, an operating temperature at or above the evaporation temperature.

Such an abnormal operating condition of the drainer can be easily detected from the exterior of the device by merely placing a few drops of water on a flat test surface 35 which is provided on the housing 11 at a point adjacent to and immediately above the inlet 12. If the bellows has failed, the operating temperature of the drainer will be such that the water placed on the test surface 35 will visibly fry or boil and this can be taken as an indication of the abnormal condition and of the fact that the drainer requires servicing.

As another feature of this invention, the bellows 28 is further protected by the provision of a deflector or baffle 36 located in the discharge chamber 17 and which prevents the fluid delivered by the orifice passage 24 from impinging directly against the lower end of the bellows. The deflector 36 is here shown as comprising a substantially disc-shaped plate extending transversely of the chamber 17 and preferably carried by the metering pin 29 of the bellows 28. In this instance, the deflector 36 has a central opening through which the metering pin 29 extends and the metering pin has a downwardly facing annular shoulder 37 against which the deflector is secured as by means of solder or brazing 38.

From the accompanying drawing and the foregoing detailed description it will now be readily understood that this invention provides an improved condensation drainer having the above-mentioned important novel features and advantages, and which also has the highly satisfactory operating characteristics already explained above.

Although the improved condensation drainer of this invention has been illustrated and described herein to a somewhat detailed extent, it will be understood, of course, that the invention is not to be regarded as being limited correspondingly in scope, but includes all changes and modifications coming within the terms of the claim hereof.

Having thus described my invention, I claim:

A condensation drainer of the character described comprising, a housing having therein a lower condensate collecting chamber adapted to collect a first body of condensate and an upper discharge chamber located directly above and separated from said collecting chamber by a transverse wall, means on said transverse wall defining an orifice passage connecting the lower end of said discharge chamber directly with the upper end of said collecting chamber, a depending baffle wall in said housing extending to a point adjacent the bottom of said collecting chamber, said housing also having a substantially vertical inlet passage adapted for connection of its upper end with a vapor line or the like to be drained and the lower end of which inlet passage communicates with said collecting chamber around the lower edge of said baffle wall and adjacent the bottom of said collecting chamber such that vapor and condensate being supplied through said inlet passage must enter said collecting chamber substantially at the bottom thereof and mingle with said first body of condensate for dissipation of the heat of said vapor therein before the incoming fluid can reach said orifice passage, said housing further having an opening therein at the upper end of said discharge chamber and a locating surface surrounding said opening, an expansible and contractible temperature responsive bellows in said discharge chamber, a depending metering pin connected with the lower end of said bellows for actuation thereby and disposed in flow control relation to said orifice passage to control the flow therethrough from said receiving chamber to said discharge chamber, a closure closing said opening and seating against said locating surface, said bellows having the upper end thereof connected with said closure for mounting the bellows thereon with said metering pin in said flow control relation to said orifice passage, said housing additionally having an outlet passage leading from said discharge chamber and adapted for the connection of a delivery conduit therewith, means defining a dam partially restricting said outlet passage such as to trap in said discharge chamber a second body of condensate of a depth to immerse therein a substantial portion of the length of said bellows including the lower end of said bellows, and a deflecting disk extending transversely of said discharge chamber adjacent to but below the lower end of said bellows and adapted to be impinged by fluid flowing upwardly into said discharge chamber through said orifice passage, said collecting and discharge chambers having a volume in relation to the rated flow capacity of the drainer such that said first and second bodies of condensate will normally protect said bellows against large or sudden temperature changes.

CHARLES W. ST. CLAIR.

References Cited in the file of this patent

UNITED STATES PATENTS

| Number | Name | Date |
|---|---|---|
| 1,846,226 | Smith | Feb. 23, 1932 |
| 1,884,857 | Randall | Oct. 25, 1932 |

FOREIGN PATENTS

| Number | Country | Date |
|---|---|---|
| 10,555 | Great Britain | 1913 |
| 313,322 | Germany | July 8, 1919 |